I. LEE.
DENTAL APPLIANCE.
APPLICATION FILED FEB. 11, 1919.

1,317,980.

Patented Oct. 7, 1919.

INVENTOR:
Ira Lee
BY
Pierre Barnes
ATTORNEY

UNITED STATES PATENT OFFICE.

IRA LEE, OF SEATTLE, WASHINGTON.

DENTAL APPLIANCE.

1,317,980.  Specification of Letters Patent.  Patented Oct. 7, 1919.

Application filed February 11, 1919. Serial No. 276,298.

*To all whom it may concern:*

Be it known that I, IRA LEE, a citizen of the United States, residing at Seattle, in the county of King and State of Washington, have invented certain new and useful Improvements in Dental Appliances, of which the following is a specification.

This invention relates to dental apparatus and, more especially, to devices adapted to be used in connection with a tooth grinding or boring appliance for supplying water for cooling or cleansing a tooth being operated upon.

The object of the invention is the provision of a simple, efficient and conveniently operated attachment of the above-mentioned character, arranged to be attached to the so-called hand-piece of a dental boring apparatus, and controlled by a finger of the operator's hand in which said hand-piece is grasped, and affords a stream of water of a selected size and in a selected direction.

The invention is illustrated in the accompanying drawings, in which—

Figure 1:
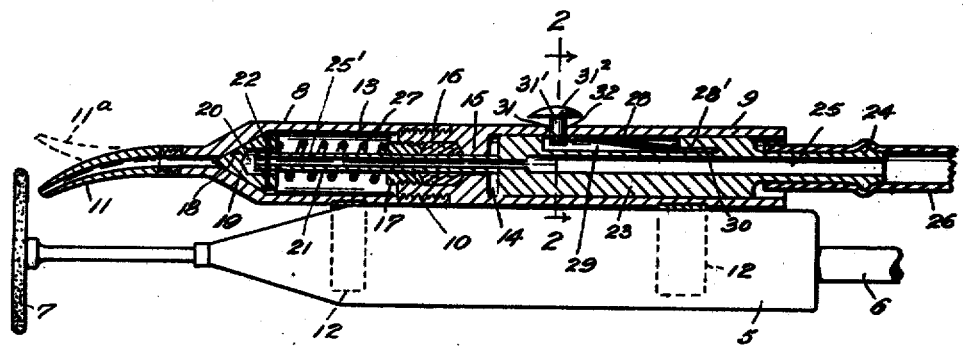
Figure 2:
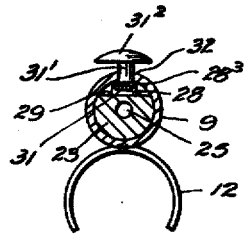
Figure 3:
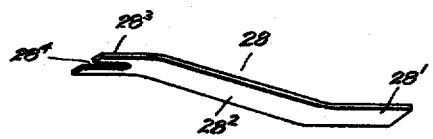

Figure 1 is a side elevational view of a portion of a dentist's tooth-grinding apparatus with appliances embodying the present invention shown in longitudinal section attached thereto. Fig. 2 is a transverse sectional view through 2—2 of Fig. 1. Fig. 3 is a perspective view of a member of the valve-opening device.

Referring to the drawings, numeral 5 designates a hand-piece such as commonly used by dentists, into which extends a flexible shaft 6 for driving a grinding wheel 7 or the like.

In carrying out my invention, I provide a casing comprising two members 8 and 9 connected together by interfitting screw threads 10 and having a detachable nozzle 11 provided on the forward end of the member 8. Said casing is adapted to be detachably connected to the hand-piece 5 by the provision on the casing of spring clips 12.

The interior of the casing is divided into two cylindrical chambers 13 and 14 by means of a partition 15 formed with a stuffing box 16 for which is provided a gland nut 17. The forward end of the casing chamber 13 is provided with a tapering seat 18 for a conical valve 19 which is utilized to regulate the discharge of a liquid from chamber 13 through the nozzle 11. The valve 19 is provided with a cavity 20 into which extends a tubular stem 21 of less diameter than said recess and is secured to the valve by means of a pin 22 extending diametrically through the coupled parts. Stem 21 extends through said stuffing box and is formed integral with a relatively large body 23 arranged for axial movements in the casing chamber 14.

A rearwardly directed nipple extension 24 is provided on body 23 for connection with a rubber tube 26 by which water under pressure is supplied through the duct 25, 25¹ of the aforesaid body and stem into the chamber 13.

27 represents a helical spring interposed between the gland nut 17 and the valve 19 for yieldingly retaining the latter on its seat 18.

To open the valve I provide a longitudinal flexible bar 28, shown detached in Fig. 3, located in a peripheral recess 29 of the body 23 and having its rear end engaged in a slot 30 extending from said recess. The part or tongue 28¹ of the bar within slot 30 is offset by a relatively inclined central part 28² from the tongue 28³ at the other end of the bar.

The tongue 28³ is bifurcated to afford a slot 28⁴ to receive the neck 31 of a stud 31¹ which is fitted for movement radially of the device in an aperture 32 of the casing member 9. On outer end of stud 31¹ is a head 31².

With the valve 19 seated, the bar 28 will be in its flexed normal state, as shown in Figs. 1 and 2, to retain the stud 31¹ in its outermost position. By pressure down on the stud, however, the bar is straightened, resulting in the body 23 and its stem element 21 being pushed rearwardly to effect the opening of the valve for the discharge of water.

By pressing the stud down to different extents, the amount of the valve's opening movement may obviously be regulated with a consequent variation in the quantity of water discharged.

The nozzle 11, as illustrated, is directed to deliver water upon the grinding wheel 7 to prevent the same becoming hot.

If desired, the nozzle may be employed to deliver cooling water against or into the cavity of a tooth, either by turning the nozzle, as indicated by dotted lines 11ª, so that the wheel 7 will not interfere, and by suitably manipulating the hand piece, water can be discharged upon a tooth.

What I claim is—

1. In a device of the character described, a casing having a fluid discharge opening at one end, a valve seat provided in the casing adjacent to said opening, a valve for said seat, a spring tending to retain said valve on the seat, a fluid supply tube, connections provided in the casing between said tube and the valve, said connection having a fluid passage extending therethrough and affording communication between said tube and the interior of the casing in proximity to said valve seat, and means for effecting movements to said connections whereby the valve is withdrawn from its seat for the discharge of liquid from the device.

2. In combination with the hand-piece of dental grinding apparatus, a device comprising a tubular casing with a liquid discharge opening at one end, a valve seat provided interiorly of the casing adjacent to said discharge opening, a valve for said seat, a body having a duct extending therethrough and arranged for reciprocatory movements in the casing, said body being operatively connected with said valve, and means actuated by the operator through the medium of said body for actuating the valve.

3. A device used in connection with the hand-piece of dental apparatus, comprising a casing, a nozzle attachment therefor, said casing being divided into two chambers, one of said chambers communicating with the passage extending through said nozzle and formed to provide a valve seat at the end of the chamber adjacent to said nozzle, a spring-closing valve for said seat, a body mounted for reciprocatory movements in the chamber remote from the nozzle end of the casing, said body having an axial passage and extensions from each of its ends, one of said extensions serving as a stem for the valve, and the other extension serving as a nipple hose-coupling element, a stud arranged for movements radially of the device in a hole provided in the casing thereof, and a flexible bar having one of its ends connected to said body and its other end connected to the stud whereby the latter may be utilized to effect the opening of the valve with respect to its seat.

Signed at Seattle, Washington, this 5th day of February, 1919.

IRA LEE.

Witness:
E. PETERSON.

Copies of this patent may be obtained for five cents each, by addressing the "Commissioner of Patents, Washington, D. C."